US012668531B2

(12) United States Patent
Buskens et al.

(10) Patent No.: US 12,668,531 B2
(45) Date of Patent: Jun. 30, 2026

(54) THERMOCHROMIC MATERIALS AND PREPARATION METHOD

(71) Applicants: Nederlandse Organisatie voor toegepast-natuurwetenschappelijk onderzoek TNO, s-Gravenhage (NL); Chemelot Scientific Participations B.V., Geleen (NL)

(72) Inventors: Pascal Jozef Paul Buskens, Kerkrade (NL); Zeger Alexander Eduard Pieter Vroon, Eijsden (NL); Daniel Enrico Mann, Aachen (DE); Arnoldus Dominicus Maria Roberto Habets, Epen (NL); Cindy Po Keh Yeung, Maastricht (NL)

(73) Assignees: Nederlandse Organisatie voor toegepast-natuurwetenschappelijk onderzoek TNO, s-Gravenhage (NL); Chemelot Scientific Participations B.V., Geleen (NL)

( * ) Notice: Subject to any disclaimer, the term of this patent is extended or adjusted under 35 U.S.C. 154(b) by 478 days.

(21) Appl. No.: 17/999,976

(22) PCT Filed: May 31, 2021

(86) PCT No.: PCT/NL2021/050346
§ 371 (c)(1),
(2) Date: Nov. 28, 2022

(87) PCT Pub. No.: WO2021/242109
PCT Pub. Date: Dec. 2, 2021

(65) Prior Publication Data
US 2023/0219841 A1 Jul. 13, 2023

(30) Foreign Application Priority Data

May 29, 2020 (EP) ..................................... 20177572
Aug. 21, 2020 (EP) ..................................... 20192225

(51) Int. Cl.
C03C 17/25 (2006.01)
C09D 1/00 (2006.01)
(Continued)

(52) U.S. Cl.
CPC ................ C03C 17/25 (2013.01); C09D 1/00 (2013.01); C09D 5/028 (2013.01); C09D 5/26 (2013.01);
(Continued)

(58) Field of Classification Search
None
See application file for complete search history.

(56) References Cited

U.S. PATENT DOCUMENTS

2017/0369330 A1* 12/2017 Schultz .................. C01G 31/02

FOREIGN PATENT DOCUMENTS

CN 103243317 A 8/2013
CN 105236763 A 1/2016
(Continued)

OTHER PUBLICATIONS

Zhang et al., "Hydrothermal growth of VO2 nanoplate thermochromic films on glass with high visible transmittance," Scientific Reports 6:27898 DOI: 10.1038/srep27898; 12 pages.
(Continued)

*Primary Examiner* — Ronak C Patel
(74) *Attorney, Agent, or Firm* — Daniel A. Thomson; Emerson Thomson Bennett

(57) ABSTRACT

The disclosure pertains to thermochromic materials, coatings, to coated articles and to preparation methods. In addition, the disclosure relates to thermochromic particulate material comprising vanadium (IV) oxide. A described preparation method involves curing of the coating using two curing stages performed with different oxygen levels.

4 Claims, 4 Drawing Sheets

A

B

(51) Int. Cl.
    *C09D 5/02*           (2006.01)
    *C09D 5/26*           (2006.01)
    *C09D 5/29*           (2006.01)
    *C09K 9/00*           (2006.01)

(52) U.S. Cl.
    CPC .................. *C09D 5/29* (2013.01); *C09K 9/00*
        (2013.01); *C03C 2217/228* (2013.01); *C03C*
      *2218/113* (2013.01); *C03C 2218/32* (2013.01)

(56)           References Cited

FOREIGN PATENT DOCUMENTS

| | | | |
|---|---|---|---|
| CN | 105439458 | A | 3/2016 |
| CN | 105694615 | A | 6/2016 |
| CN | 106892573 | A | 6/2017 |
| CN | 108300002 | A | 7/2018 |
| CN | 108946809 | A | 12/2018 |
| EP | 2368858 | A2 | 9/2011 |

OTHER PUBLICATIONS

Shiskin et al., "Doped vanadium oxides phase transitions vapors influence," Sensors and Actuators B 108 (2005) p. 113-118; 6 pages.
Schlaefer Johannes et al., "Thermochromic VO2—SiO2 nanocomposite smart window coatings with narrow phase transition hysteresis and transition gradient width," Solar Energy Materials and Solar Cells; Elsevier Science Publishers, vol. 200 (2019)).

* cited by examiner

THERMOCHROMIC MATERIALS AND PREPARATION METHOD

FIELD

The invention relates to materials comprising a thermochromic component, to articles comprising such material and to a preparation method.

INTRODUCTION

Vanadium (IV) oxide ($VO_2$) is known as being able to undergo a fully reversible metal-to-semiconductor phase transition between a low temperature monoclinic phase $VO_2$ (M) and a high temperature rutile phase $VO_2$ (R). The rutile phase is a semi-metal, reflecting and/or absorbing a wide range of solar wavelengths in the infrared. The monoclinic phase is a semiconductor and reflects and/or absorbs considerably less solar infrared light. It has been suggested to use $VO_2$ in window coatings to obtain glass windows for buildings which block more (near) infrared from sunlight with increasing temperatures. This can advantageously be used to decrease energy consumption for cooling of buildings with windows. The thermochromic switching temperature of $VO_2$ is 68° C. Doping with metal ions can be used to decrease the switching temperature e.g. to 25-30° C.

Shiskin et al. Sensors and Actuators B 108 (2005) p. 113-118 describes the decomposition of vanadyl oxalate to $VO_2$, wherein the vanadyl oxalate is obtained by heating a mixture of $V_2O_5$ in oxalic acid. The subsequent annealing occurred under a nitrogen atmosphere at temperatures in the range of 650-1100 K.

There remains a desire for thermochromic materials that when applied as a coating on window glass provide for energy savings for buildings; as well as for such coatings, coated articles, and windows.

SUMMARY

The invention pertains in a first aspect to a thermochromic material, in particular a thermochromic coating, comprising vanadium (IV) oxide and exhibiting $SSF_{coating}=Tvis*\Delta Tsol>600$ and preferably also $Tvis\geq60\%$, preferably when applied as a single layer of between 50 nm and 500 nm thickness, wherein Tvis is the % visible light transmission and $\Delta Tsol$ is the % solar modulation. The factor $SSF_{coating}$ can be referred to as the 'SunSmart Factor' of the coating.

The invention also pertains to a coated article comprising a substrate and a coating, wherein the coating comprises a thermochromic material comprising vanadium (IV) oxide and wherein the coating exhibits $SSF_{coating}=Tvis*\Delta Tsol>600$ and $Tvis\geq60\%$, wherein Tvis is the % visible light transmission and $\Delta Tsol$ is the % solar modulation. The coated article preferably has said thermochromic material as coating.

The invention also pertains to a thermochromic material, in particular a thermochromic particulate material, comprising vanadium (IV) oxide and exhibiting $SSF_{particulate}=\Delta H/\Delta T_{switch}>2.5$, preferably with a $T_{switch,H}<50°$ C., more preferably $5<T_{switch,H}<35$ and an average particle size ranging between 10-500 nm, wherein $\Delta H$ is the switching enthalpy and $\Delta T_{switch}=T_{switch,H}-T_{switch,C}$, wherein $T_{switch,H}$ and $T_{switch,C}$ are the switching temperature upon heating and cooling, respectively. The factor $SSF_{particulate}$ can be referred to as the 'SunSmart Pigment Factor' of the particulate material.

The invention also pertains to a substrate comprising a thermochromic material as described above and a matrix, such as a polymer matrix or a sol-gel matrix. An example of a substrate is glass, such as coated glass or laminated glass, wherein the thermochroic material is e.g. in the coating or in the laminate.

The invention also pertains to preparation method for a thermochromic material, wherein the thermochromic material comprises vanadium (IV) oxide, the method comprising: providing a liquid formulation comprising an organometallic V(IV) complex in solution and a reactive diluent and/or binder material; drying the liquid formulation at least partly into a solid material; and thermally treating the solid material; wherein the thermal treatment comprises a first and a second step, wherein the first treatment step is performed at a first oxygen concentration of at least 5 vol % and a temperature below 300° C., and the second treatment step involves further heating to increase the temperature by at least 100° C. under an oxygen concentration that is lower than in the first treatment step and that is at least 10 ppm. The preparation method preferably yields the inventive thermochromic coating and the inventive coated article. The inventive thermochromic coating and the inventive coated article are preferably obtainable by or obtained by the inventive preparation method.

Figure 1:
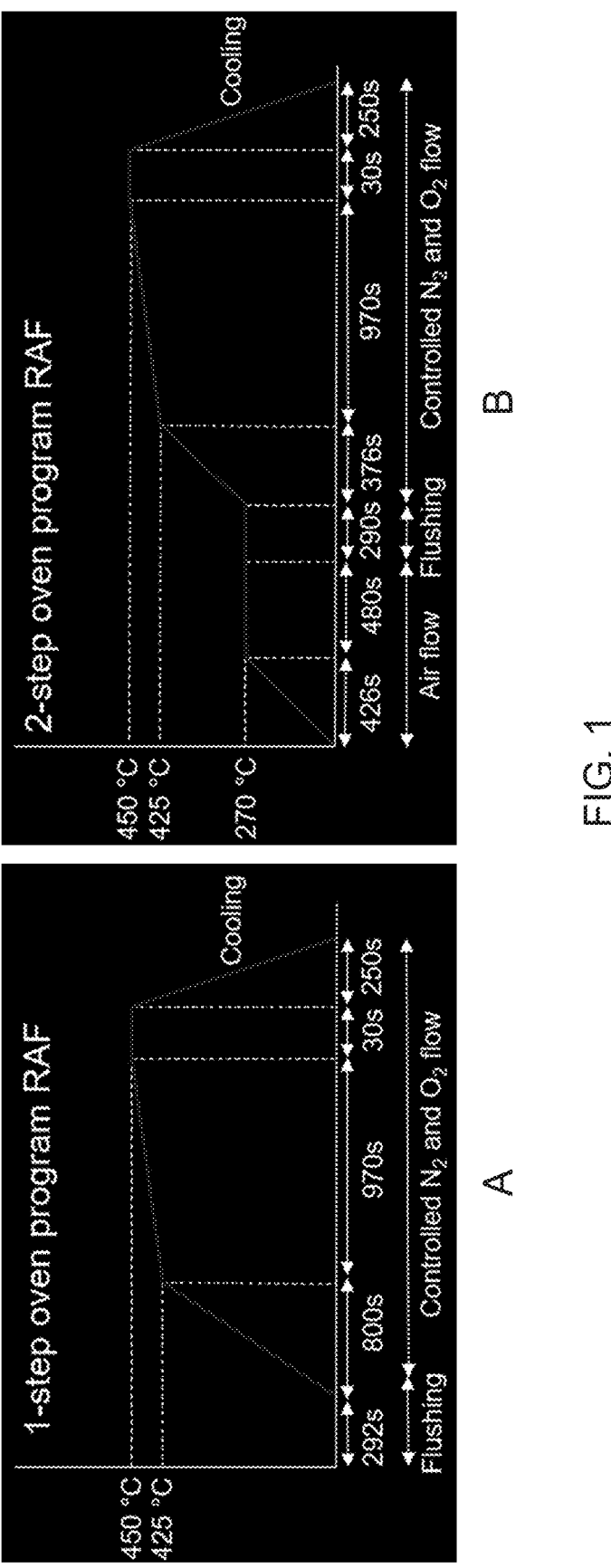
FIG. 1 schematically illustrates an example oven programme for curing used in the method of the invention.

The figures are illustrative only and do not limit the claims or the invention.

DETAILED DESCRIPTION

The present application is in a first aspect based on the judicious insight that considerable energy savings for buildings can be obtained with thermochromic materials that exhibit as single layer coating, a high visible light transmission in combination with a high solar modulation, such that $SSF_{coating}=Tvis*\Delta Tsol$ is at least 600, preferably wherein $SSF_{coating}$ is at least 700. The factor $SSF_{coating}$ can be referred to as the SunSmart Factor (SSF) of the coating. Furthermore, Tvis is preferably at least 60%.

As used herein. Tvis [%] is the % visible light transmission and $\Delta Tsol$ [%] is the % solar modulation.

Tvis is measured at a temperature lower than the thermochromic switching temperature. The solar modulation $\Delta Tsol$ is e.g. calculated using following formula:

$$\Delta Tsol = \tau_e(\text{cold}) - \tau_e(\text{hot})$$

wherein $\tau_e$ (cold) is the solar direct transmission of the material at a temperature lower than the thermochromic switching temperature and $\tau_e$ (hot) is the solar direct transmission of the material at a temperature above the thermochromic switching temperature.

Tvis and Tsol are for instance measured according to standard NEN-EN 410, in particular according to NEN-EN 410:2011. This European Standard specifies methods of determining the luminous and solar characteristics of glazing in buildings. Tvis and/or Tsol can also be measured using Method A as described in the present document.

$SSF_{coating}$ can be calculated by multiplication of the numeric percentage values of Tvis and Tsol.

The present application also pertains to such a thermochromic material and related preparation methods, as well as to a coated article. The inventive preparation methods use two thermal treatment (e.g. coating curing) steps with different oxygen levels. This was found to surprisingly yield a very good conversion of the organometallic vanadium (IV) complex into $VO_2$ (M).

An aspect of the invention provides a thermochromic material, in particular a thermochromic coating, comprising vanadium (IV) oxide and preferably exhibiting $SSF_{coating}$=Tvis*$\Delta$Tsol>600, or even $SSF_{coating}$>700, preferably when applied as a single layer of between 50 nm and 500 nm thickness. Herein, Tvis [%] is the % visible light transmission and $\Delta$Tsol [%] is the % solar modulation, preferably as further specified in Method A hereinafter. In some embodiments. $SSF_{coating}$ is more than 750 or even above 800 or even more than 900.

Preferably Tvis is at least 60%. Preferably $\Delta$Tsol is at least 10%.

In some embodiments, the thermochromic material exhibits Tvis of at least 60% and $\Delta$Tsol of at least 10%.

The $SSF_{coating}$ of a layer of material depends on the layer thickness and the concentration of thermochromic material in the layer. For single-layer thermochromic coatings, which are applied in one single deposition step, the coating thickness is in the range between 50 and 500 nm. The thermochromic material exhibits the mentioned $SSF_{coating}$ and Tvis preferably when applied as a single layer of between 50 nm and 500 nm thickness. The thermochromic coating preferably has a thickness in the range between 50 nm and 500 nm.

The vanadium (IV) oxide is typically present as monoclinic vanadium (IV) oxide in the thermochemical material. The thermochromic material comprises for instance monoclinic vanadium (IV) oxide crystals, for instance as elongated crystals of 100-200 nm length and 20-50 nm thickness, for instance embedded in a $SiO_2$ matrix, or for instance as spherical or ellipsoidal $VO_2$ domains in a $SiO_2$ matrix.

An aspect of the invention provides a coated article comprising a substrate and a coating, wherein the coating comprises a thermochromic material comprising vanadium (IV) oxide and wherein the coating exhibits $SSF_{coating}$=$T_{vis}$*$\Delta$Tsol>600, or even $SSF_{coating}$>700, wherein $T_{vis}$ is the % visible light transmission and $\Delta$Tsol is the % solar modulation. Preferably Tvis is at least 60%.

The coating has a thickness of e.g. more than 50 nm or more than 90 nm or more than 100 nm, in some embodiments less than 500 nm or less than 200 nm. The coating is e.g. a single layer coating of the thermochromic material. The coating is applied in one single deposition step. The coating layer e.g. consists of the inventive thermochromic material. The coated article is e.g. prepared using the inventive preparation method, in particular using a thermal treatment comprising a first step and a second step with different $O_2$ levels as described herein.

The coating comprises for instance at least 1.0 wt. % $SiO_2$, or e.g. at least 20 wt. % $SiO_2$, such as 30-60 wt. %

$SiO_2$, relative to the total material. $SiO_2$ is for instance advantageously used as a binder and/or reactive diluent as discussed hereinafter.

The thermochromic material and/or the coating material of the coated article comprises for instance at least 20 wt. % or at least 30 wt. % or at least 50 wt. % or at least 60 wt. % $VO_2$, relative to total weight of the material. The material comprises for instance at least 0.10 wt. % of another solid component such as a binder, more preferably at least 1.0 wt. % and/or preferably maximum 50 wt. %, such as 5 to 25 wt. % relative to the total material.

The material comprises for instance at least 1.0 wt. % and/or less than 50 wt. % of one or more of $SiO_2$, $ZrO_2$, $TiO_2$, $Al_2O_3$, $HfO_2$, $MgF_2$, $CaF_2$, and organosiloxane compounds, based on these compounds in total relative to total material. These solid materials are e.g. used as binder. Particularly preferred is $SiO_2$ (silica) as binder. The material comprises for instance at least 1.0 wt. % and/or less than 60 wt. % of $SiO_2$, relative to the total material. The thermochromic material, e.g. coating material, comprises e.g. $SiO_2$ in a $VO_2$:$SiO_2$ volume ratio in the range 30:70-70:30 or in the range 40:60-60:40 on the basis of the solid components $VO_2$ and $SiO_2$ and assumed densities of 4.57 g·cm⁻³ for $VO_2$ and 1.50 g·cm⁻³ for $SiO_2$ respectively.

The material comprises for instance V and Si atoms in an atomic (number of atoms) ratio of V:Si of at least 0.5, at least 1.0, at least 2.0, at least 4.0 or at least 5.0 or at least 6.0 and preferably less than 20 or less than 10, for example in a ratio V:Si atoms of 2 to 20, 2 to 10, or 5 to 15.

The thermochromic material and/or the coating material comprises for instance at least 20 vol. % or at least 25 vol. % or at least 50 vol. % and/or for instance less than 90 vol. % $VO_2$ relative to the total material. The material comprises for instance at least 5.0 vol. % or at least 10 vol. % and/or less than 90 vol. % of the solid component relative to the total material. The material comprises for instance at least 5.0 vol. % or at least 10 vol. % and/or less than 90 vol. % $SiO_2$ relative to the total material excluding porosity. The material comprises for instance at least 5.0 vol. % or at least 10 vol. % and/or less than 90 vol. % of one or more of $SiO_2$, $ZrO_2$, $TiO_2$, $Al_2O_3$, $HfO_2$, $MgF_2$, $CaF_2$, and organosiloxane compounds, based on these compounds in total relative to total material. The volume percentages are for instance measured at 20° C. and 0.1 MPa and for instance using inductive coupled plasma-optical emission spectroscopy for the determining the elemental rates and FTIR for confirmation of the species for the relevant elements. The volume percentages are for instance based on solid components excluding porosity.

The thermochromic material and/or coating material comprises optionally one or more doping ions. The doping ions are for instance ions of W, Ta, Nb, Mo, Al, F, or a mixture of these ions. Doping ions can be used for decreasing the switching temperature. The material includes the doping ions for instance in an atomic ratio (number of atoms) of V atoms to doping ions of at least 30 or at least 100 and typically less than 200, based on doping ions in total. The material for example includes W in an atomic ratio (by number of atoms) of V atoms to W atoms of e.g. more than 10 and/or less than 200, such as in the range of 20-50. As used herein, ionic species are counted as atoms.

In some embodiments, the solid material obtained after the thermal treatment is used in granular or particulate form, e.g. as powder, such as a pigment composition. The solid material is e.g. processed into a powder having a desired particle size, such as with a size reduction technique such as milling. The powder has for instance an average particle size in the range of 10 to 50) nm, e.g. 50 to 200 nm, measured using e.g. dynamic light scatting (DLS).

The invention also pertains to the thermochromic material obtainable by or obtained with the preparation method for a thermochromic material provided herein.

The thermochromic material is for instance in particulate form (also referred to as thermochromic particulate material or particulate material). The material is for instance a powder. The invention also pertains to an article comprising the thermochromic material, especially in particulate form, such as an article comprising particles of the thermochromic material. The article comprises for instance a matrix, such as a polymer matrix or a sol-gel matrix, and the thermochromic material, in particular the article comprises a polymeric matrix and particles of the thermochromic material. The particles comprise in particular $VO_2$ and are in particular capable of a thermochromic phase transition. The article is for instance a film, such as a single layer film or a multilayer film, wherein one or more of said layers comprise a polymer matrix and particles comprising or consisting of the thermochromic material. A multilayer film comprises for instance one or more layers comprising particles of the thermochromic material and optionally one or more additional layers. The layers are for instance laminated, or for instance co-extruded. The film is for instance adhesive or self-adhesive. The film is e.g. prepared by a method comprising a step of casting a slurry comprising a liquid phase, a polymer, and particles of the crystalline monoclinic $VO_2$ thermochromic material; the slurry may comprise additional particles. The cast film is e.g. laminated with other films to produce a laminated film comprising particles of the thermochromic material. The invention also pertains to such a method of preparing a film using the crystalline monoclinic $VO_2$ material.

The film is for instance applied to glass windows and glass panels. The glass panel with the applied film is for instance used for renovating buildings. The invention also pertains to a substrate, such as a glass panel, provided with such a film. The glass panel is for instance float glass. The glass panel can be used as a window for a building.

The substrate is preferably transparent for IR (750-2500 nm) and visible light. The substrate comprises e.g. $SiO_2$. The substrate is for instance float glass. The substrate, e.g. the glass panel, has for instance a width of at least 0.10 m or at least 0.5 m and a length of at least 0.10 m or at least 0.50 m. The substrate has e.g. at least one side with a surface area of at least 0.10 m. The substrate for instance comprises silica. The substrate is for instance a glass substrate.

The invention also pertains to a coated article comprising a substrate and as coating a thermochromic material is discussed. The substrate comprises for instance a non-crystalline, amorphous solid. The substrate is preferably transparent for IR (800-2400 nm) and visible light. The substrate comprises e.g. $SiO_2$. The substrate is for instance float glass. The glass panel has for instance a width of at least 0.10 m or at least 0.5 m and a length of at least 0.10 m or at least 0.50 m. The substrate has e.g. at least one side with a surface area of at least 0.10 $m^2$. The substrate for instance comprises silica. The substrate is for instance a glass substrate.

The invention pertains in an aspect to a preparation method for a thermochromic material. The thermochromic material comprises vanadium (IV) oxide. The method involves: providing a liquid formulation comprising an organometallic V(IV) complex solution and preferably a reactive diluent and/or binder, such as a $SiO_2$ sol; drying the liquid formulation into a solid material; and thermally treating the solid material, wherein the thermal treatment comprises a first and a second step, wherein the first treatment step is performed at a first oxygen concentration of at least 5 vol % and a temperature below 300° C. and the second treatment step involves further heating to increase the temperature by at least 100° C. under an oxygen concentration that is lower than in the first treatment step and that is at least 10 ppm.

The preparation method can used for preparing particulate thermochromic material (pigment composition).

In a preferred embodiment the preparation method is a method for preparing a coated article comprising the thermochromic material as a coating layer, wherein the article comprises a substrate and a coating of a thermochromic material. In this embodiment, the first and the second thermal treatment step are in particular a first and a second curing step for the curing the coating to form a thermochromic coating. Preferences for the thermochromic material and the coated article of the invention apply also for the product prepared in the preparation method.

The thermochromic material comprises vanadium (IV) oxide. In embodiment, the method involves applying a liquid formulation (coating formulation) comprising an organometallic V(IV) complex and preferably a reactive diluent and/or binder as a coating onto a substrate.

The organometallic V(IV) complex comprises one or more ligands, preferably comprises as ligand a carboxylic acid, in particular a dicarboxylic acid, such as oxalic acid, or the conjugate base of such an acid, such as oxalate. The ligand is e.g. a chelating ligand.

The liquid formulation preferably also comprises one or more selected from $SiO_2$, $ZrO_2$, $TiO_2$, $Al_2O_3$, $HfO_2$, $MgF_2$, $CaF_2$, an organosiloxane compound, and precursors thereof. These components can be used as binder and/or reactive diluent. The liquid formulation preferably comprises a precursor having film-forming properties or a precursor for a solid component as discussed. The liquid formulation may contain additional components. Preferably the formulation comprises a colloidal sol, e.g. a $SiO_2$ sol, and a V(IV) complex solution, preferably vanadium (IV) oxalate solution. Preferably the method involves preparing the formulation by mixing at least such a sol and a solution. The solid particles of the colloidal sol are e.g. used as binder of the coating.

In a preferred embodiment, two liquid compositions are prepared. A first liquid composition is e.g. a colloidal sol, such as a $SiO_2$ sol e.g. made from silica precursor, such as tetraethyl orthosilicate, an acid and liquid phase, e.g. a solvent, such as an alcohol. A second liquid composition is a vanadium (IV) complex solution. The vanadium (IV) complex solution is for instance made directly from a V(IV) precursor or from a vanadium (V) precursor and a reducing agent, and further a solvent such as an alcohol.

Preferably these two liquid compositions are mixed to form the liquid formulation.

In the embodiment of preparing a coated article, the liquid formulation is for instance applied on the substrate by drip coating or roll coating. The speed of dip coating or roll coating are for instance used to adjust the coating thickness; other process parameters can also be used to adjust the coating thickness. The method for instance involves drying the coating after the liquid formulation is applied.

The drying may involve e.g. solvent evaporation, e.g. removal of at least 50 wt. % of the solvent. The drying may also involve removal of at least 50 wt. % of the liquid components of the liquid formulation, e.g. by evaporation. The drying is carried out at a temperature of e.g. 5° C.-150°

C., preferably 10-100° C. The drying is optionally carried out under reduced pressure or vacuum. e.g. a pressure of less than 100 mbar absolute.

The method for preparing a coated article involves curing the coating. e.g. after said drying step. The curing involves at least a first and a second step. The method typically involves drying the liquid formulation at least partly into a solid material, and thermally treating the solid material. The thermal treatment involves a first step and a second step. The first thermal treatment or curing step for instance involves chemical decomposition of a vanadium (IV) complex and/or decomposition of organic molecules such as excess reducing agents.

The second step is carried out after the first step. Additional steps are optionally carried out before the first step, between the first step and after the second step, and after the second step.

The first and second step are preferably both carried out at a pressure of at least 0.10 bar absolute, more preferably at least 1.0 bar absolute. Thereby e.g. ambient pressure can advantageously be used. Inert gas pressure in the second step may be used to transport reducing gases such as carbon monoxide out of the furnace. Preferably the first and second step are independently carried out under a gaseous flow. Preferably the first and second step are independently carried out in a reactor furnace having a gas inlet and separate gas outlet and during the process gas is supplied to the gas inlet and gas is withdrawn from the gas outlet. For example the gas hourly space velocity is at least 1.0 $hr^{-1}$ (i.e. no stagnant atmosphere) or at least 10 $hr^{-1}$ or at least 10 $hr^{-1}$.

The first step of the thermal treatment is preferably performed at a first oxygen concentration of at least 5 vol. % and preferably at a temperature below 300° C., e.g. in the range of 200 to 300° C. The $O_2$ content is e.g. at least 10 vol. % such as at least 15 vol. %, and is e.g. less than 99 vol. % or less than 25 vol. %.

The first curing step is e.g. carried out under an atmosphere containing at least 1 vol. % inert gas such as $N_2$. The atmosphere e.g. consists or essentially consist of oxygen in the recited amounts and inert gas, with the inert gas being e.g. $N_2$.

The first step has a duration of e.g. more than 60 sec or more than 120 sec and preferably of less than 60 min or less than 30 min. The first step may comprise a heating step (ramping step) and a plateau step. The heating is e.g. carried out with heating rate in the range of 0.15° C./sec to 2° C./sec. preferably in the range of 0.30° C./sec to 1° C./sec. The heating is carried out e.g. from ambient temperature to a e.g. temperature above 200° C. and below 300° C. The plateau phase generally involves keeping the temperature stable (such as less than 20° C. or less than 10° C. variation) for e.g. at least 60 sec or at least 200 sec and typically for less than 10 min, at a temperature in the range of e.g. 200 to 300° C., preferably in a range of 260 to 300° C. or especially in a range of 265° C. to 280° C., for instance for a duration of at least 100 seconds, e.g. 100 to 1200 seconds, or 100 to 500 seconds, preferably for a duration of 200 to 500 seconds.

In a particularly preferred embodiment, the first step comprises a stage wherein the solid material is maintained at a temperature in the range of 265° C. to 280° C. for a duration of at least 100 seconds, preferably for a duration of 200 to 500 seconds under an atmosphere with an $O_2$ content of at least 5.0 vol. %, preferably of 10-25 vol. % $O_2$.

In embodiments using vanadium (IV) oxalate, oxalate comprised in vanadium (IV) oxalate used as precursor and/or excess oxalic acid as reducing agent may be removed from the solid material in the first step, preferably without substantial oxidation of the vanadium (IV). The first step is for instance carried out in air at a temperature of 265° C. to 280° C. e.g. about 270° C., preferably for a duration of at least 100 seconds.

The first step for instance involves chemical decomposition of the vanadium (IV) complex, for example with CO and $CO_2$ evolving from the sample.

The second step may involve transformation of the vanadium oxide into monoclinic vanadium (IV) oxide.

As illustrated in Example 4, these considerations may also be used for preparing particulate thermochromic material.

The second step of the thermal treatment is carried out under a lower $O_2$ concentration than the first step and at a higher temperature than the first step. The curing is preferably performed in an oven and the second step preferably involves heating the oven by at least 50° C. or at least 100° C. and e.g. by less than 300° C., for instance for preparing coatings. The second step may involve heating the coating temperature by at least 50° C. or by at least 100° C. and e.g. by less than 300° C.

The second step may involve increasing the temperature by at least 50° C. or by at least 100° C. to a temperature of e.g. in the range of 400 to 2000° C., such as in the range of 400 to 1600° C., or e.g. in the range of 500 to 1500° C., and for instance may comprise a step with a duration of at least 30 seconds, or at least 1 minute, or at least 10 minutes, in the range of 500 to 1500° C., for instance at an $O_2$ concentration of less than 100 ppm by volume (ppmv), or less than 20 ppmv, or less than 10 ppmv. Such a second step can in particular be useful for preparing the thermochromic material in particulate form. In such a method, the starting material for the first thermal treatment step is preferably in particulate form.

The heating in the second step may involve heating from a temperature below 300° C., e.g. from a temperature in the range of 200 to 300° C. to a temperature above 400° C. The second step is e.g. performed at a temperature below 800° C. or below 700° C., for instance in case of preparing a coating. The second thermal treatment step may involve a ramping step and subsequently a plateau step.

The ramping (heating) is e.g. performed with a heating rate of less than 5° C./sec or less than 2° C./sec and typically more than 0.10° C./sec. The heating in the second curing step is e.g. slower than heating in the first curing step. The plateau phase is e.g. 10 sec. to 10 minutes, e.g. 10 to 120 sec, at a temperature in the range of 400-500'C. e.g. in the range of 430 to 470° C. for instance in case of preparing coatings.

For instance for preparing particulate material, the second thermal treatment step may involve a ramping stage and a plateau stage. The heating rate in the ramping stage is e.g. at least 5° C./min or at least 10° C./min. The plateau stage involves e.g. maintaining the sample at a temperature in the range of 750 to 1500° C., e.g. 800° C. to 1200° C., for instance for a duration of at least 30 min or at least 60 min or at least 120 min.

The second curing step is e.g. performed in an atmosphere comprising at 99 vol. % inert gas, such as at least 99.9 vol. % or at least 999000 ppm inert gas, the inert gas is e.g. $N_2$. The atmosphere of the second step e.g. consists or essentially consists of $O_2$ and inert gas, wherein the inert gas is e.g. $N_2$.

The oxygen content in the second step is preferably controlled. The oxygen content in the second step is e.g. above 10 ppm and is e.g. in the range 30 to 1000 ppm, with the remainder preferably being inert gas such as $N_2$.

Especially good results were obtained with an oxygen content in the range 50-500 ppm.

As used in herein, gas percentages and fractions (e.g. ppm values) are on volume basis and relative to the total atmosphere, in particular for the first and second thermal treatment step.

The second step may be used for the formation of monoclinic $VO_2$ crystals in the material.

The preferences and details for the first and second curing step apply also for the method for preparing particulate thermochromic material e.g. a powder or pigment composition.

The thermal treatment, such as curing may involve additional steps, for instance additional steps prior to the first step, additional steps between the first and the second step and additional steps carried out after the second step. The second step is carried out after the first step. The second step does not overlap in time with the first step. Preferably, at least a flushing step is carried out between the first and the second step. The flushing involves e.g. alternatingly applying vacuum, e.g. a pressure of less than 50 mbar absolute, and inert gas such as $N_2$ at ambient pressure e.g. 0.5-2.0 bar absolute.

The first and the second thermal treatment step are for instance independently carried out a pressure in the range of 0.50-5.0 bar absolute, such as 0.8-2.0 bar absolute, e.g. 1.0-2.0 bar absolute. The first and the second thermal treatment step are e.g. carried out both at ambient pressure.

The gas flow rate (sccm=standard cubic centimetre per minute) in the first and the second step are for instance substantially the same, such as the gas flow rate in the second stage being 50% to 100% of the gas flow rate in the first stage.

In conclusion, the present disclosure pertains to thermochromic materials, thermochromic coatings, to coated articles and to preparation methods, and to particulate materials. A described preparation method involves curing of the coating using two curing stages performed with different oxygen levels.

EXAMPLES

Aspects of the present disclosure will now be further illustrated by the following non-limiting examples.

Example C1 (One-Step Curing)

Coated articles were prepared using curing in an oven using the one-step oven program specified in Table 1 and as illustrated in FIG. 1A. Sample C1 was prepared as shown in Table 3. The preparation method was the same as for Example 1, except in the different thermal treatment (oven programme).

Sample C2 with the relatively high thickness of 150 nm was prepared using the oven programme of Table 1. For this sample, the coating was applied by dipping a glass plate with 4 mm/sec in a 0.4 M solution. Sample C2 is an opaque dark grey coating. Sample C2 did not exhibit thermochromic switching in the range 900-1700 nm between 20° C. and 120° C.

Example 1

Coated articles were prepared using curing in an oven using the two-step curing program specified in Table 2 and as illustrated in FIG. 1B. Examples E1-E3 were prepared as shown in Table 3. The samples E1-E3 had a thickness of at least 90 nm and advantageously exhibited SSF=Tvis*ΔTsol>600, even exhibited an SSF above 700.

In Table 3, "$VO_2$:$SiO_2$" indicates the volume ratio of the solid components $VO_2$ and $SiO_2$, assuming densities of 4.57 g·cm$^{-3}$ for $VO_2$ and 1.50 g·cm$^{-3}$ for $SiO_2$, respectively.

Tlum [%] (also referred to as Tvis) and ΔTsol [%] were measured using Method A described herein. Gas flows in Table 1 and Table 2 are in sscm with 20° C. and 1.03 bar as standard conditions.

TABLE 1

| Step # | Duration seconds | Activity | Nominal oxygen concentration ppm | Total gas flow cm³/min (sccm) |
|---|---|---|---|---|
| 1 | 2 | Nothing | $2*10^5$ | 0 |
| 2 | 25 | Reducing pressure (<15 mbar) | — | — |
| 3 | 25 | Returning to ambient pressure | 5 | >2000 |
| 4 | 25 | Reducing pressure (<15 mbar) | — | — |
| 5 | 30 | Returning to ambient pressure | 0.5 | 2000 |
| 6 | 25 | Reducing pressure | — | — |
| 7 | 30 | Returning to ambient pressure | 0.5 | 2000 |
| 8 | 25 | Reducing pressure (<15 mbar) | — | — |
| 9 | 40 | Returning to ambient pressure | 76 | 1978 |
| 10 | 25 | Reducing pressure (<15 mbar) | — | — |
| 11 | 40 | Returning to ambient pressure | 76 | 1978 |
| 12 | 800 | Heating from ambient temperature to 425° C. | 111 | 452 |
| 13 | 970 | Heating from 425° C. to 450° C. | 111 | 452 |
| 14 | 30 | Isothermal at 450° C. | 111 | 452 |
| 15 | 250 | Cooling 450° C. to 20° C. | 0.5 | 200 |

TABLE 2

| Step | Duration seconds | Activity | Nominal O$_2$ concentration of introduced gas ppm | Total gas flow cm$^3$/min (sccm) |
|---|---|---|---|---|
| 1 | 2 | Nothing | $2*10^5$ | 0 |
| 2 | 424 | Heating from ambient temperature to 270° C. | $2*10^5$ | 402 |
| 3 | 480 | Isothermal 270° C. | $2*10^5$ | 402 |
| 4 | 25 | Isothermal 270° C. | $2*10^5$ | 1828 |
| 5 | 25 | Isothermal 270° C. Nitrogen purge | 5 | >2000 |
| 6 | 25 | Reducing pressure (<15 mbar) Isothermal 270° C. | — | — |
| 7 | 30 | Returning to ambient pressure Isothermal 270° C. | 0.5 | 2000 |
| 8 | 25 | Reducing pressure (<15 mbar) Isothermal 270° C. | — | — |
| 9 | 30 | Returning to ambient pressure Isothermal 270° C. | 0.5 | 2000 |
| 10 | 25 | Reducing pressure (<15 mbar) Isothermal 270° C. | — | — |
| 11 | 40 | Returning to ambient pressure Isothermal 270° C. | 76 | 1978 |
| 12 | 25 | Reducing pressure (<15 mbar) Isothermal 270° C. | — | — |
| 13 | 40 | Returning to ambient pressure Isothermal 270° C. | 76 | 1978 |
| 14 | 376 | Heating from 270° C. till 425° C. | 111 | 452 |
| 15 | 970 | Heating from 425° C. till 450° C. | 111 | 452 |
| 16 | 30 | Isothermal at 450° C. | 111 | 452 |
| 17 | 250 | Cooling 450° C. to 20° C. | 0.5 | 200 |

TABLE 3

| Sample | C1 | C2* | E1 | E2 | E3 |
|---|---|---|---|---|---|
| VO$_2$:SiO$_2$ | 40:60 | 50:50 | 40:60 | 50:50 | 50:50 |
| Curing | one step | one step | two step | two step | two step |
| Thickness [nm] | 97 | 154 | 102 | 96 | 140 |
| Tlum [%] | 67 | — | 74 | 66 | 61 |
| ΔTsol [%] | 7.8 | — | 10 | 11.8 | 15.3 |
| SSF = Tlum*ΔTsol | 523 | — | 740 | 779 | 933 |

*C2 doesn't exhibit thermochromic properties

Methods for Example 1 and Example C1

Pre-Treatment of Glass Substrate

Pilkington Optiwhite™ glass of 4 mm is cut to a size of 10.0×10.0) cm. The resulting plates are placed into a Branson 5510 ultrasonic; bath filled with solution D used for cleaning. The bath is heated to 60° C. The material is ultrasonicated for 4 h and left in the bath for another 20 h. The glass is then removed from the bath, rinsed with demineralized water 18.2 mΩ*cm at 25° C. and left to dry at ambient conditions. Glass substrates which did not displayed a homogeneous wetting of water with a contact angle lower the 10° where rejected.

Solution D: The cleaning solution for purpose of cleaning of glass substrates is made by the addition of 310 g of NH$_4$OH 30% wt in water, followed by 186 g of hydrogen peroxide 50 wt. % in water to 9000 g of demineralized water 18.2 mΩ*cm at 25° C. This is stirred for 0.25 h then used as such.

Applying Barrier Coating

The barrier coating was applied on both sides of the glass substrates using dip coating. For this purpose mixture B was used. The substrates were submerged into and retracted from mixture B at 2.0 mm/s with a holding time of 5 seconds. After complete retraction from mixture B, the coated glass substrates were left to dry for 5 minutes at <35% relative humidity and 19-25° C. after which they were placed into furnace. The coated glass substrates were annealed under air at a temperature of 450° C. for 1 h. The annealed coated glass substrates where rinsed with demineralized water 18.2 mΩ*cm at 25° C., then dried at ambient conditions.

Formulation Preparation

The liquid coating formulation was prepared as follows. Mixture A and Mixture B were prepared as described hereinafter. To Mixture A is first added 2-propanol until a concentration is achieved of 0.2 mol/kg V$^{4+}$ ions whilst stirring. Mixture B is added to Mixture A, stirred for 5 minutes, and left for 24 hours. The volume ratios of the mixtures correspond to Table 3. After 24 hours the formulations can be used as such.

Applying Thermochromic Coating

The thermochromic coating was applied on one single-side of the glass substrate using dip-coating. To achieve this, one-side of the barrier coated glass substrate was masked using d-c-Fix® self-adhesive foil. The substrates were submerged into and retracted from a liquid coating formulation (see Table 3) which at least contains mixture A (vanadyl oxalate), and comprises amounts of mixture B (silica sol), at 1 to 8 mm/s with a holding time of 5 seconds in the bath. After complete retraction from mixture B, the coated glass substrates were left to dry for up to 5 minutes at <35% rH and 20-25° C. Subsequently the masking foil was removed and the coated glass substrate was placed onto a 6 inch silicon wafer in the Rapid Thermal Processor (RTP), with the non-coated side of the glass-substrate facing the silicon wafer.

Thermal Treatment

The coatings were cured using a Rapid Thermal Processor (RTP) JetFirst PV from ECM technologies equipped with mass-flow controllers. Gasses used in the RTP were nitrogen HQ 6.0 supplied by Linde Gas Benelux B.V. and an oxygen/nitrogen mixture with nominal value 0.100% ($O_2$)/99.900% ($N_2$) supplied by Linde Gas Benelux B.V. For temperature control the equipped pyrometer sensor was used, calibrated with the standard thermocouple against a n-type (dopant PH) silicon wafer (diameter 150 mm and thickness 508 µm (+/−15 µm). The silicon wafer was facing the pyrometer with the non-polished side at a height of 6.90 mm above the base of the heating chamber of the furnace using quartz spacers. After calibration of the pyrometer, substrates are placed on this pre-positioned silicon wafer on the polished side, facing the heating elements.

Mixtures

Mixture A: vanadyl oxalate solution, 0.27 mol/kg. A 500 ml glass bottle with wide bottleneck, equipped with an overhead stirrer and a funnel, is placed in an oil-bath, pre-heated till 80° C. Into the bottle is added 70.2 g oxalic acid (0.780 mol) and subsequently 18.0 g water (1.0 mol). This is then stirred for 15 minutes. The mixture is a white slurry. After 15 minutes, the addition of the 33.0 g vanadium pentaoxide $V_2O_5$ (0.182 mol) is started. Small amounts of approximately 1 g are added via the funnel at intervals of circa 1 minute. After the complete addition of the vanadium pentaoxide the reaction mixture is stirred for another 0.75 h at 80° C. Subsequently the oil bath is removed and the reaction mixture is allowed to cool to ambient temperature, simultaneously the mixture is diluted using 150 g 2-propanol (2.50 mol). After one hour stirring at room temperature, the reaction is diluted with 2-propanol to the desired concentration of 0.27 mol/kg $V^{4+}$ ions.

Mixture B: This mixture is prepared following the method described in J. Langanke et al., Journal of Sol-Gel Science and Technology 2013, 67, 282-287. The silica solution is prepared by the addition of 156.3 g tetraethoxysilane (0.75 mol) to a solution of 347.3 g of iso-propanol and 135 g demineralized water 18.2 mΩ*cm at 25° C. After the addition of 4.5 g glacial acetic acid (0.075 mol) under vigorous stirring, the formulation is moderately stirred for additional 24 h at room temperature. Afterwards the formed sol is diluted with 3113.4 g iso-propanol and acidified by the addition of 1.5 g concentrated nitric acid.

Measurement Methods

Layer Thickness

To determine the layer thickness the following method has been chosen: during the application method on a position on the substrate a piece of substrate is masked using Scotch® Magic™ tape from 3M, before annealing the coating this piece is removed leaving behind an uncoated part on the substrate. This is needed to measure the height difference between coating and substrate. Using a Dektak®XT benchtop stylus profilometer made by Bruker, this height difference is then determined. Settings used are: measurement range 6.5 µm; scan length 2000 µm; duration 20 seconds; stylus type 2 µm; stylus force 5 mg.

Surface Roughness

Surface roughness is defined using profile data developed using stylus-based measurement systems such as Dektak®XT benchtop stylus profilometer made by Bruker. Settings used are: measurement range 6.5 µm; scan length 100 µm; duration 100 seconds; stylus type 2 µm; stylus force 2 mg.

Method A: Visible Light Transmission and Solar Modulation Values

This and ΔTsol were calculated using transmission data obtained by method A1 and formulas for visible light transmission and solar direct transmission according to NEN-EN 410.

Tvis (Visible Light Transmission):

The visible light transmittance $\tau_e$ of the glazing is calculated using the following formula:

$$\tau_v = \frac{\sum_{\lambda=380nm}^{780nm} D_\lambda \tau(\lambda) V(\lambda) \Delta\lambda}{\sum_{\lambda=380nm}^{780nm} D_\lambda V(\lambda) \Delta\lambda}$$

wherein: $D_\lambda$ is the relative spectral distribution of illuminant D65 (see Publication CIE No. 15, Colorimetry, 3rd ed (2004)); $\tau(\lambda)$ is the spectral transmittance of the glazing: $V(\lambda)$ is the spectral luminous efficiency for photopic vision defining the standard observer for photometry (see Publication CIE No. 15, Colorimetry, 3rd ed. (2004)); $\Delta\lambda$ is the wavelength interval.

ΔTsol (Solar Modulation):

The solar modulation ΔTsol is calculated using following formula:

$$\Delta Tsol = \tau_e(\text{cold}) - \tau_e(\text{hot})$$

wherein $\tau_e$ (cold) is the solar direct transmission of the glazing in the cold state; $\tau_e$ (hot) is the solar direct transmission of the glazing in the hot state.

The solar direct transmittance $\tau_e$ of the glazing is calculated using the following formula:

$$\tau_e = \frac{\sum_{\lambda=300nm}^{2500nm} S_\lambda \tau(\lambda) \Delta\lambda}{\sum_{\lambda=300nm}^{2500nm} S_\lambda \Delta\lambda}$$

wherein $S_\lambda$ is the relative spectral distribution of the solar radiation (see Publication CIE No. 85. Solar spectral irradiance, technical report (1989)): $\tau(\lambda)$ is the spectral transmittance of the glazing: $\Delta\lambda$ is the wavelength interval.

Method A1: Optical Measurements

The coatings were analysed using a Perkin Elmer UV/VIS/NIR Spectrometer Lambda 750 with UL150t, this is a spectrometer equipped with an upward looking 150 mm integrating sphere accessory with temperature controlled sample holder. The substrates where heated and cooled at a rate of 1° C./min at 2° C. intervals in a temperature range of −10° C. till 120° C. The subsequent transmission and reflection were measured between 250-2400 nm with 10 nm intervals. The temperature measurement was determined by placing a thermocouple at the coated side, which was facing the integrating sphere.

Switching Point (Coating)

For the determination of the switching point, the transmission is plotted as function of temperature measured at 1600 nm, yielding a hysteresis plot. The hysteresis plot is then divided into four mathematical linear equations of which two are parallel to the temperature axes. The two remaining vertical linear equations are determined by fitting the upward curve and downward curve (see FIG. 2).

Figure 2:
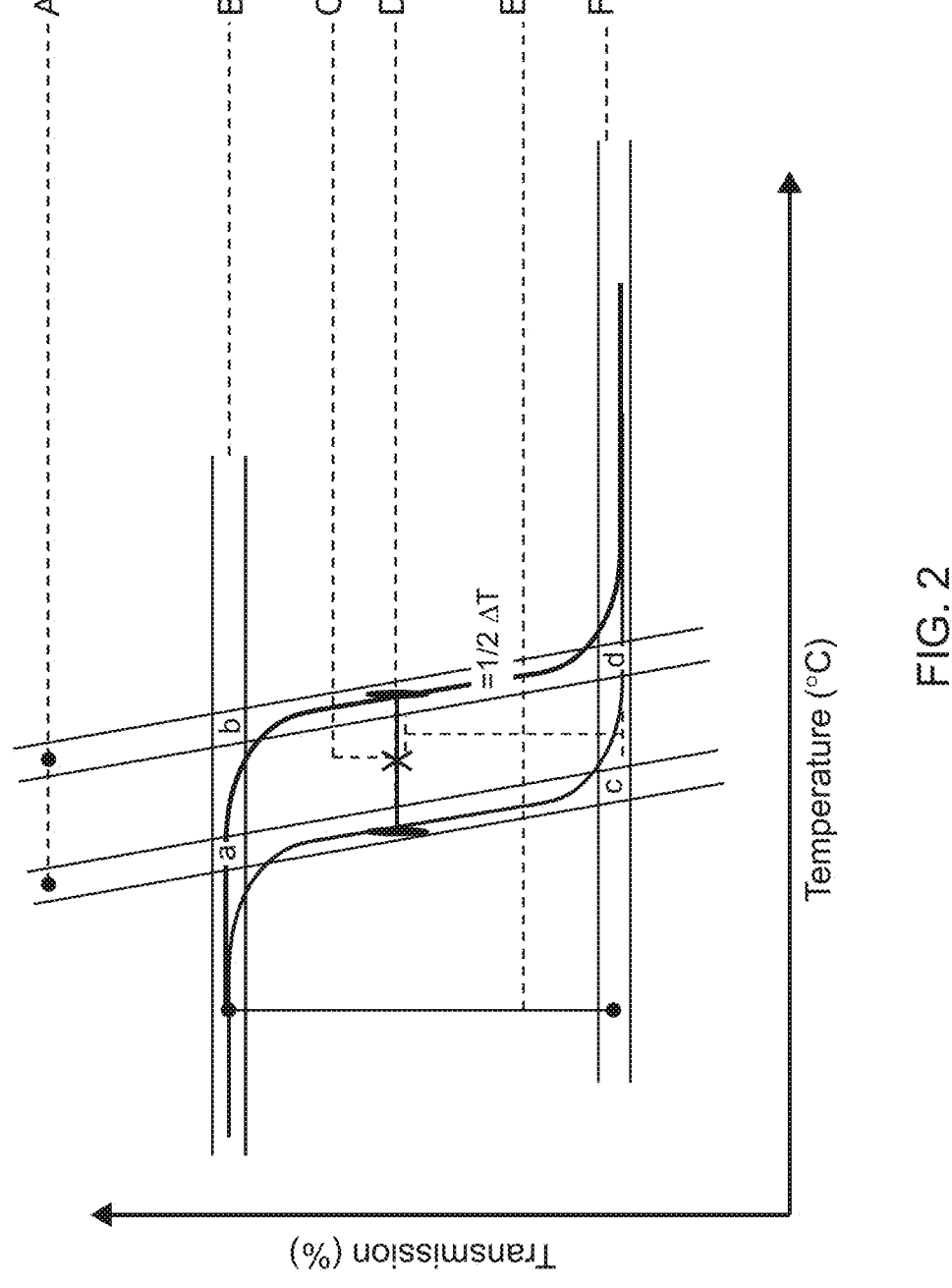
FIG. 2 illustrates an example schematic hysteresis plot of a thermochromic coating.

FIG. 2 illustrates an example schematic hysteresis plot of a thermochromic coating. In FIG. 2, A indicates Δ transmission<−0.1% & >0.1%. B indicates Δ transmission≥−0.1% &

≤0.1%, C indicates the switching point in ° C. at half hysteresis width, D indicates hysteresis width in ° C. at half $\Delta T$, E indicates $\Delta$ transmission modulation value=$\Delta T$, and F indicates $\Delta$ transmission≥−0.1% & 0.1%. As illustrated in FIG. 2, determination of parallel is when the difference in gradient between 2 measured points at a 2° C. interval is ≥−0.1% transmission and ≤0.1% transmission. The definition of a vertical slope is determined when the gradient between 2 measured points at a 2° C. interval is <−0.1% transmission and >0.1% transmission. The hysteresis width in ° C. is then determined via determining the points of tangency of the four resulting crossing points (depicted as the points a, b, c, and d in FIG. 2) of the linear equations. Subsequently the hysteresis width is determined by dividing the corresponding subtracting the low from the high transmission value and adding it to the low value for vertical cooling linear fit as for the vertical heating linear fit. The hysteresis width is then the corresponding temperature values subtracted from each other. The switching point is the temperature (of the point X) at 50% hysteresis width (see FIG. 2).

Particle Size

Particle sizes and polydispersity indices (PDIs) were measured using Dynamic Light Scattering (DLS). Measurements were performed at 25° C. using a Zetasizer Nano Series from Malvern Instruments with an accuracy of ≤±2% using a quartz glass cell for optical measurements (Malvern Instruments, Malvern, UK). As average particle size the z-average value is used.

Switching Enthalpy

The switching enthalpy ($\Delta H$) was measured using Differential Scanning Calorimetry (DSC), which was carried out amount of oxygen was used (110 ppm in mixture with $N_2$), for Sample C 0.100% $O_2$ in a mixture with $N_2$ was used in the second stage. Samples A and C did not show switching behaviour and are not thermochromic. Sample B showed very good thermochromic properties. The coatings contained $VO_2$ and $SiO_2$ and were generally prepared in the same way as in Example 1. The preparation methods for samples A, B and C differed only in the oxygen level in the second curing stage.

Example 3

The annual energy consumption and energy and cost savings over clear glass were modelled for double glazing windows featuring coatings according to Example C1 and Example 1 in combination with a commercial 'low-e' coated glass installed in a free standing residential building with 172 $m^2$ living space and 25% window facade located in The Netherlands. Additionally annual $CO_2$ emission savings for the whole Dutch built environment were calculated if the total building stock would be equipped with energy-efficient glazing. Energy consumption and $CO_2$ emissions were based on modelled energy consumption for lighting, cooling and heating. Lighting and cooling were modelled as using electricity, heating as using a boiler fed with natural gas.

Figure 5:
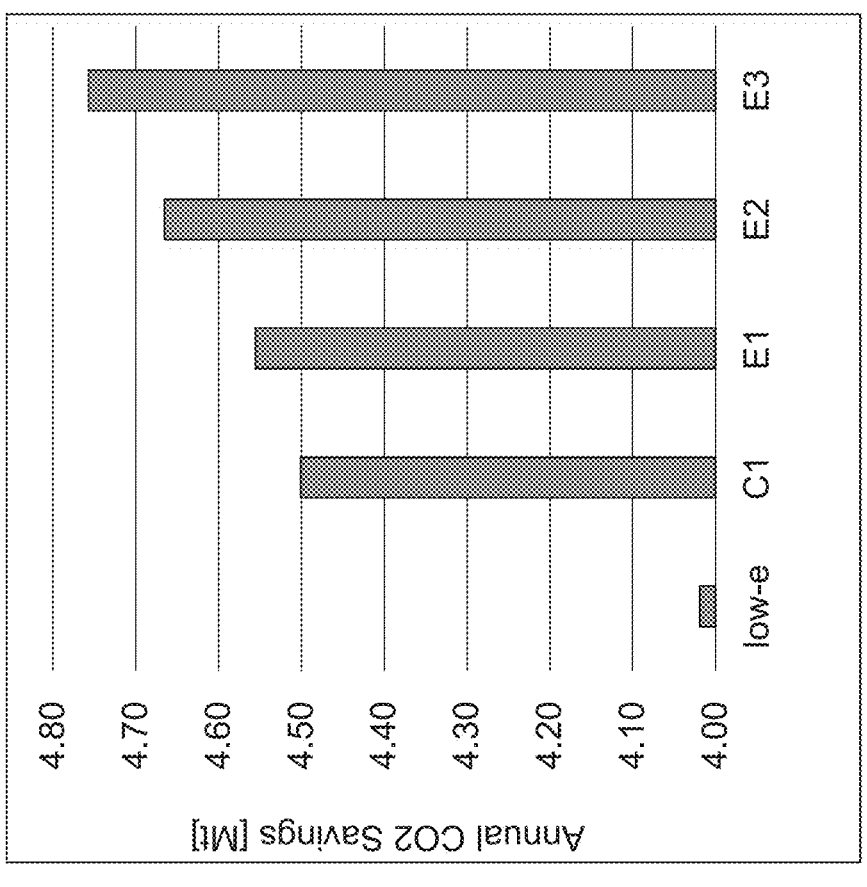
FIG. 5 shows modelling results of annual energy consumption and energy and cost savings for double glazing windows featuring coatings according to the invention installed in a residential building.

The results are shown in Table 4 and in FIG. 5. Samples with a higher SSF value provided for larger $CO_2$ emission reduction. Notes to Table 4: (a): saving upon replacing all windows in NL with energy-efficient glazing; (b): source TNO report 2019 "Potential Impact of High-Performance Glazing on Energy and CO2 Savings in Europe".

TABLE 4

|  | double clear | low-e | C1 | E1 | E2 | E3 |
|---|---|---|---|---|---|---|
| lighting [kWh] | 4019 | 4032 | 4124 | 4101 | 4133 | 4170 |
| heating [kWh] | 11406 | 8737 | 9016 | 8895 | 9109 | 9465 |
| cooling [kWh] | 4250 | 2938 | 2182 | 2248 | 1925 | 1478 |
| total [kWh] | 19675 | 15707 | 15321 | 15244 | 15168 | 15114 |
| savings [%] |  | 20.17 | 22.13 | 22.52 | 22.91 | 23.18 |
| savings [€] |  | 506 | 638 | 637 | 687 | 754 |
| savings [$CO_2$ in Mt] [a] |  | 4.02 [b] | 4.50 | 4.56 | 4.67 | 4.76 | on a Discovery DSC (TA Instruments). The undoped and W-doped $VO_2$ powder samples (40 mg) were placed in pans (TA instruments, $T_{zero}$ aluminium hermetic pan with inverted lid). All samples were subjected to a heating rate of 5° C./min. The switching enthalpy is calculated from the DSC measurement using the TA instruments TRIOS software v5.0.

Switching Temperature ($T_{switch}$) (Particulates)

The switching temperature of the thermochromic particulates was defined as the temperature at minimum and maximum heat flow in the DSC curve upon heating $T_{switch,H}$ and upon cooling $T_{switch,C}$, respectively. The switching hysteresis width ($\Delta T_{switch}$) was defined as $\Delta T_{switch}$= $T_{switch,H}-T_{switch,C}$.

Example 2

Figures 3, 4:
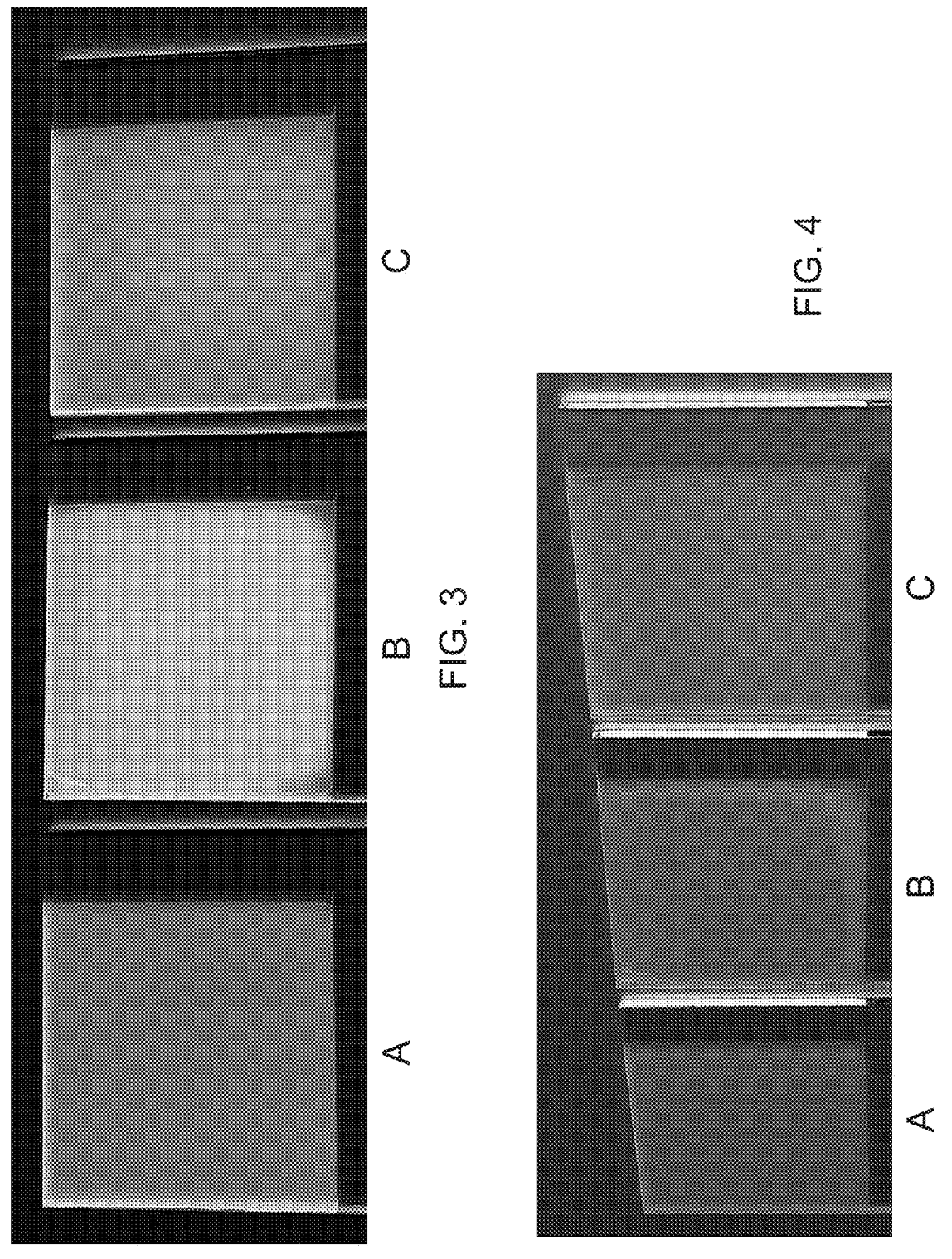
FIG. 3 shows photographs of inventive coated articles (transmittance).
FIG. 4 shows photographs of inventive coated articles (reflectance).

The effect of the $O_2$ in the second curing stage was studied and is illustrated in FIG. 3 (transmittance) and FIG. 4 (reflectance). In the coating of comparative Sample A, no oxygen was used (only $N_2$), in sample B the standard

Example 4

Fabrication of $VO_2$ Particulate

A tungsten solution was prepared by dissolving tungsten hexachloride (99.9+%, Acros Organics) in 2-propanol to a concentration of 0.052 mol/kg.

To an appropriate amount of mixture A as described herein-above (vanadyl oxalate solution) was added the tungsten solution in the following percentage ratios by atom of W to V to form 0.0, 1.0, 1.5, 2.0, 2.5, 3 and 3.5 atom %. The mixture was then stirred for 16 hours. The solvent was then removed using a rotary evaporator (9 mbar/50° C.). The dried powder was placed into a quartz crucible which was placed into the centre of the quartz tube furnace (Nabertherm® R170/1000/12), subsequently heated twice. The first thermal treatment step was carried out in air, an airflow is let over the material at 1.5l/min. with a heating rate of 5° C./min to 270° C. and 1 hour isothermal period. The second thermal treatment step was carried out in a static inert nitrogen (>99.9 vol. %: less than 5 ppmv $O_2$) atmosphere with a heating rate of 10° C./min to 1000° C. and 1 hour isothermal. The example was performed with the furnace placed in Schlenk-line like setup.

The results are shown in Table 5.

TABLE 5

Switching temperature and enthalpy
of the $VO_2$ doped powder samples

| Tungsten doping | Peak temperature (° C.) [±1] | | Average enthalpy (J/g) [±1] | |
| --- | --- | --- | --- | --- |
| (atm. %) | Heating | Cooling | Heating | Cooling |
| 0 | 72.2 | 60.4 | 55.6 | 55.3 |
| 1.0 | 49.4 | 40.3 | 41.8 | 42.3 |
| 1.5 | 33.0 | 23.3 | 27.1 | 27.1 |
| 2.0 | 26.5 | 18.1 | 30.1 | 28.7 |
| 2.5 | 15.1 | 6.0 | 27.5 | 27.1 |
| 3.0 | 4.4 | −4.5 | 24.1 | 27.0 |
| 3.5 | −11.3 | −18.9 | 20.9 | 25.7 |

Example 5

Based on the oven programme of FIG. 1B and using similar procedure and coating samples as in Example 1, the stage 270° C./480 s air flow in that FIG. 1B was varied in duration from as 670 s, 120 s, 240 s, 480 s, 960 s, and 1920 s, and in temperature from 225° C. to 280° C. Optimum coating properties (exhibiting switching behaviour and thermochromic properties) were obtained at 240 s and 480 s and 260-275° C. in particular with 270° C. and 480 s.

Example 6

The thermal treatment of vanadyl oxalate samples was studied using thermogravimetric analysis (TGA) coupled with infrared (FTIR) with heating up to 600° C. at 10° C./min under dry air respectively $N_2$ Water loss was observed below 100° C. Various decompositions steps of the oxalate complexes were observed from 150° C. wherein evolution of $CO_2$ and other species (CO, formic acid) was observed. A distinct residual minor weight loss step with low evolved gas intensity was observed at higher temperatures (above about 400°) wherein the residual weight is higher for the experiments under air.

The invention claimed is:

1. A thermochromic particulate material comprising vanadium (IV) oxide and one or more doping ions, wherein the thermochromic particulate material exhibits a $SSF_{particulate} = \Delta H / \Delta T_{switch} > 2.5$, with a $T_{switch,H} < 50°$ C. and an average particle size ranging between 10-500 nm, wherein $\Delta H$ is the switching enthalpy and $\Delta T_{switch} = T_{switch,H} - T_{switch,C}$, wherein $T_{switch,H}$ and $T_{switch,C}$ are the switching temperature upon heating and cooling, respectively.

2. A composition comprising a matrix and the thermochromic particulate material according to claim 1.

3. An article comprising the composition according to claim 2, wherein the article is a film.

4. The article according to claim 3, wherein the matrix is a polymer matrix or a sol-gel matrix.

* * * * *